United States Patent
Kumar et al.

(10) Patent No.: US 6,922,745 B2
(45) Date of Patent: Jul. 26, 2005

(54) METHOD AND APPARATUS FOR HANDLING LOCKS

(75) Inventors: Harish Kumar, Portland, OR (US); Aravindh Baktha, Portland, OR (US); Mike D. Upton, Portland, OR (US); KS Venkatraman, Hillsboro, OR (US); Herbert H. Hum, Portland, OR (US); Zhongying Zhang, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 315 days.

(21) Appl. No.: 10/139,215

(22) Filed: May 2, 2002

(65) Prior Publication Data

US 2003/0208647 A1 Nov. 6, 2003

(51) Int. Cl.[7] .............................. G06F 12/14
(52) U.S. Cl. ...................... 710/200; 711/163
(58) Field of Search .............. 710/200; 711/145, 711/163

(56) References Cited

U.S. PATENT DOCUMENTS

| | | |
|---|---|---|
| 4,949,239 A | 8/1990 | Gillett, Jr. et al. |
| 5,029,072 A | 7/1991 | Moyer et al. |
| 5,060,144 A | 10/1991 | Sipple et al. |
| 5,127,089 A | 6/1992 | Gay et al. |
| 5,175,829 A | 12/1992 | Stumpf et al. |
| 5,226,143 A | 7/1993 | Baird et al. |
| 5,276,847 A | 1/1994 | Kohn |
| 5,404,482 A | 4/1995 | Stamm et al. |
| 5,442,755 A | 8/1995 | Shibata |
| 5,452,463 A | 9/1995 | Parks et al. |
| 5,561,780 A | 10/1996 | Glew et al. |
| 5,592,641 A | 1/1997 | Fandrich et al. |
| 5,630,075 A | 5/1997 | Joshi et al. |
| 5,678,026 A | 10/1997 | Vartti et al. |
| 5,715,428 A | 2/1998 | Wang et al. |
| 5,740,401 A | 4/1998 | Hanawa et al. |
| 5,751,996 A | 5/1998 | Glew et al. |
| 5,787,486 A * | 7/1998 | Chin et al. ................. 711/163 |
| 5,887,194 A | 3/1999 | Carson et al. |
| 5,889,983 A | 3/1999 | Mittal et al. |
| 5,913,224 A | 6/1999 | MacDonald |
| 6,006,299 A | 12/1999 | Wang et al. |
| 6,098,134 A | 8/2000 | Michels et al. |
| 6,122,715 A | 9/2000 | Palanca et al. |
| 6,323,755 B1 * | 11/2001 | Lee et al. ................... 710/200 |
| 6,334,171 B1 | 12/2001 | Hill et al. |
| 6,356,983 B1 * | 3/2002 | Parks ......................... 711/145 |
| 6,370,625 B1 * | 4/2002 | Carmean et al. ............ 711/152 |
| 6,389,519 B1 * | 5/2002 | Thusoo et al. .............. 711/152 |
| 6,691,194 B1 * | 2/2004 | Ofer ........................... 710/200 |
| 2002/0065968 A1 * | 5/2002 | Bryant et al. ............... 710/200 |

FOREIGN PATENT DOCUMENTS

EP 000535696 A2 * 4/1993 ........... G06F/15/16

OTHER PUBLICATIONS

U.S. Appl. No. 09/474,698, Douglas M. Carmean, et al., "Method and Apparatus for Lock Synchronization in a Microproccesor System", Dec. 29, 1999.

* cited by examiner

Primary Examiner—Glenn A. Auve
(74) Attorney, Agent, or Firm—Kerry D. Tweet

(57) ABSTRACT

A method and device for determining an attribute associated with a locked load instruction and selecting a lock protocol based upon the attribute of the locked load instruction. Also disclosed is a method for concurrently executing the respective lock sequences associated with multiple threads of a processing device.

32 Claims, 9 Drawing Sheets

METHOD AND APPARATUS FOR HANDLING LOCKS

FIELD

Embodiments of the invention relate generally to microprocessors and other processing devices and, more particularly, to a method and apparatus for handling locks.

BACKGROUND

Microelectronic manufacturers are continually striving to improve the speed and performance of microprocessors and other processing devices, the performance of such devices being dependent upon many factors. One factor affecting the performance of a processing device is the scheduling and execution of instructions associated with a piece of code executing on that processor. To increase the speed at which a set of instructions can be executed—and, hence, to improve efficiency and performance—multi-threaded processors and multi-processor systems have been devised. Performance may also be enhanced using speculative and/or out-of-order execution of instructions. In out-of-order processing, a piece of code is not necessarily executed in the same sequence as its underlying source code and, in speculative processing, instructions are prefetched and branch prediction is performed to "guess" whether a branch condition will, or will not, be taken.

Typically, a processor includes an instruction decoder that decodes an instruction to create one or more micro-instructions, or micro-operations, that can be understood and executed by the processor. A micro-operation will also be referred to herein as a "$\mu$OP." A series of $\mu$OPs associated with a piece of code may be scheduled for execution on a processor (or on a specific thread thereof), this scheduling potentially being speculative or out-of-order, as noted above. If a $\mu$OP properly executes, that $\mu$OP is retired. However, if a $\mu$OP does not, for any reason, properly execute, the $\mu$OP is again scheduled and replayed for execution. Although the set of $\mu$OPs associated with the piece of code may be executed out of order, the $\mu$OPs must generally be retired in order.

For systems incorporating multi-threaded processors and/or multiple processing devices, the multiple threads and/or multiple processors may often times need to share data stored within the system. Care must be taken to insure that a thread or processor accesses the most recent and up-to-date data and also to insure that a thread or processor does not access and modify data currently associated with another thread or processor. Further complicating this sharing of data, most modern-day processing devices include one or more on-chip cache memories. Within a multi-processor system, the multiple on-chip caches will often—and, in practice, generally do—contain multiple copies of a data item. Accordingly, when a thread or processor accesses a copy of a data item, it must be insured that an updated or valid data value is read.

Thus, in multi-threaded processors and/or multi-processor systems, "cache coherency" must be maintained. Cache coherency refers to the synchronization of data written from, or read into, cache memory, such that any data item stored in a cache that is accessed by a thread or processor is the most recent copy of that data item. Further, any data value written from cache back into main memory should be the most current data. The accuracy and performance of speculative and out-of-order processing is highly dependent upon the consistency and synchronization of data.

One method of maintaining cache coherency and insuring that, when a data item is needed by a thread or processor, the most up-to-date value for that data item is accessed is to implement a "lock." A lock comprises a process that is performed in response to a load instruction—i.e., a $\mu$OP issued by a processor or thread requesting a specific data item from memory—to insure synchronization between processors and/or threads. A lock is an attribute of a load instruction, and the lock is typically indicated by a tag associated with the lock. A load instruction that has been tagged for lock will be referred to herein as a "locked $\mu$OP."

Generally, a lock is associated with a set of instructions, including the load instruction, an instruction to modify the data item, and a store instruction (i.e., a $\mu$OP issued by a processor to write the modified data item to memory). The lock—also referred to herein as a "lock sequence" or "lock operation"—may, for example, include acquiring ownership of a memory location that stores data (that is the subject of a tagged load instruction), performing an atomic operation on the data while preventing other processes from operating on that data, and releasing ownership of the memory location after the atomic operation is performed. An atomic operation is one that is performed sequentially and in an uninterrupted manner and, further, that is guaranteed to be completed or not completed at all (i.e., the operation is indivisible). Because execution of the set of $\mu$OPs (i.e., the load, modify, and store instructions) is atomic, the entire lock sequence is sometimes viewed as a single $\mu$OP (e.g., it appears like a single operation).

While use of locks can insure cache coherency and data integrity, this mechanism is not without its disadvantages. Specifically, the processing of a lock can introduce significant latency into the execution of a piece of code.

BRIEF DESCRIPTION OF THE DRAWINGS

FIG. 8 shows a block diagram and accompanying timeline illustrating an embodiment of a cache lock protocol.

DETAILED DESCRIPTION

Figure 1:
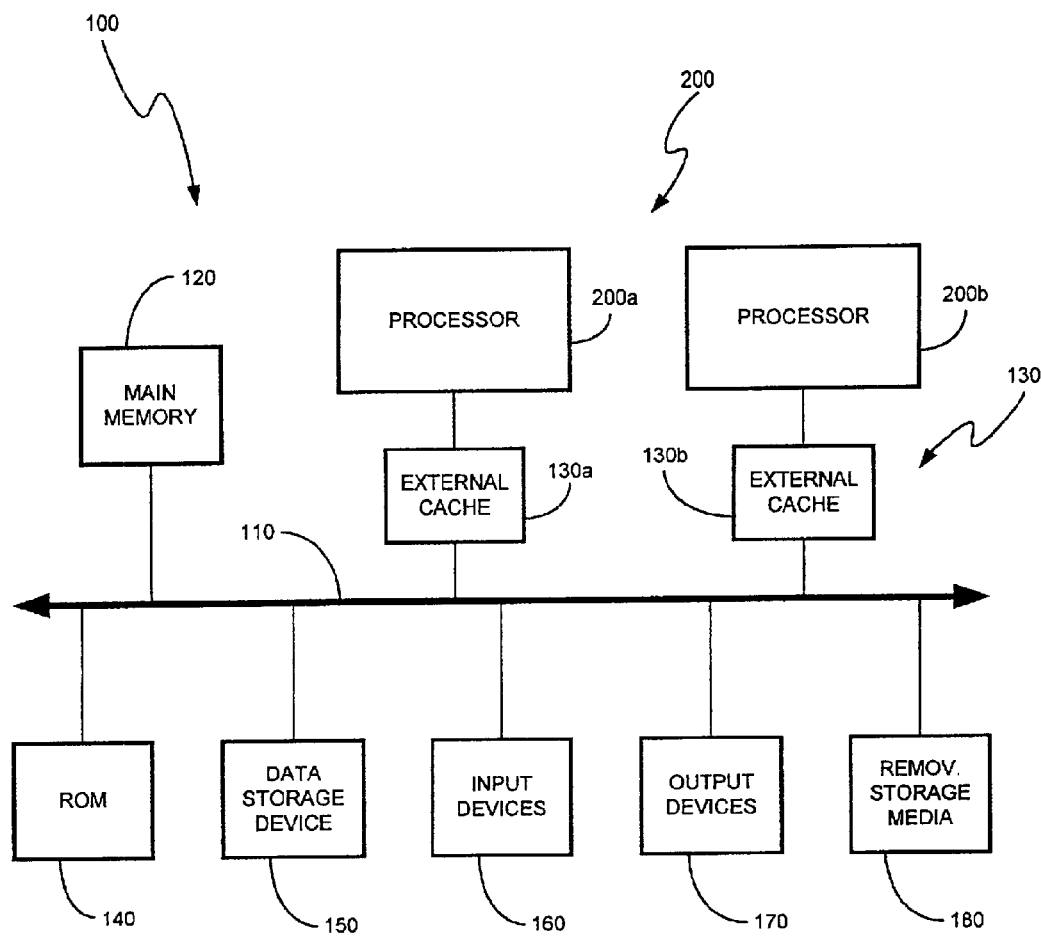
FIG. 1 shows a schematic diagram illustrating an exemplary embodiment of a computer system.

Referring to FIG. 1, an exemplary embodiment of a computer system 100 is illustrated. The computer system 100 includes a system bus 110 having one or more processing devices 200 coupled therewith, including, for example, processors 200a, 200b. Each of the processors 200a–b is associated with one or more threads. Accordingly, the computer system 100 may include any suitable number of processing devices 200, each having any suitable number of threads. Also, the processors 200a–b may each be capable of speculative and/or out-of-order execution of instructions. The processors 200a–b may each form part of a separate integrated circuit device or, alternatively, all of the processing devices 200 (or a portion thereof) may be formed on a single die.

Each of the processing devices 200 may have an external or off-chip cache 130 coupled therewith, respectively. For example, the processor 200a may have an external cache 130a coupled therewith whereas an external cache 130b may be coupled with the processor 200b, each of the external caches 130a, 130b also being coupled with the system bus 110. It should be understood that, although illustrated as separate memories, the external caches 130a–b may comprise a single, integrated memory. The computer system 100 includes a main memory 120 coupled—via system bus 110—with the processing devices 200, the main memory 120 comprising, for example, any suitable type of random access memory (RAM). The computer system 100 may further include a read-only memory (ROM) 140 coupled with the system bus 110. The processing devices 200 may also have a data storage device 150 coupled therewith by system bus 110. The data storage device 150 comprises any suitable non-volatile memory, such as, for example, a hard disk drive.

The computer system 100 may include one or more input devices 160 coupled with the system bus 110. Common input devices 160 include keyboards, pointing devices such as a mouse, and scanners or other data entry devices. One or more output devices 170 may also be coupled with the system bus 110. Common output devices 170 include video monitors, printing devices, and audio output devices (e.g., a sound card and speakers). The computer system 100 may further include a removable storage media 180, such as a floppy disk drive or CD ROM drive.

It should be understood that the computer system 100 illustrated in FIG. 1 is intended to represent an exemplary embodiment of a computer system and, further, that such a computer system may include many additional components, which have been omitted for clarity. By way of example, the computer system 100 may include a DMA (direct memory access) controller, a network interface (e.g., a network card), a chip set associated with each of the processors 200a–b, as well as additional signal lines and buses. Also, it should be understood that the computer system 100 may not include all of the components shown in FIG. 1.

Figure 2:
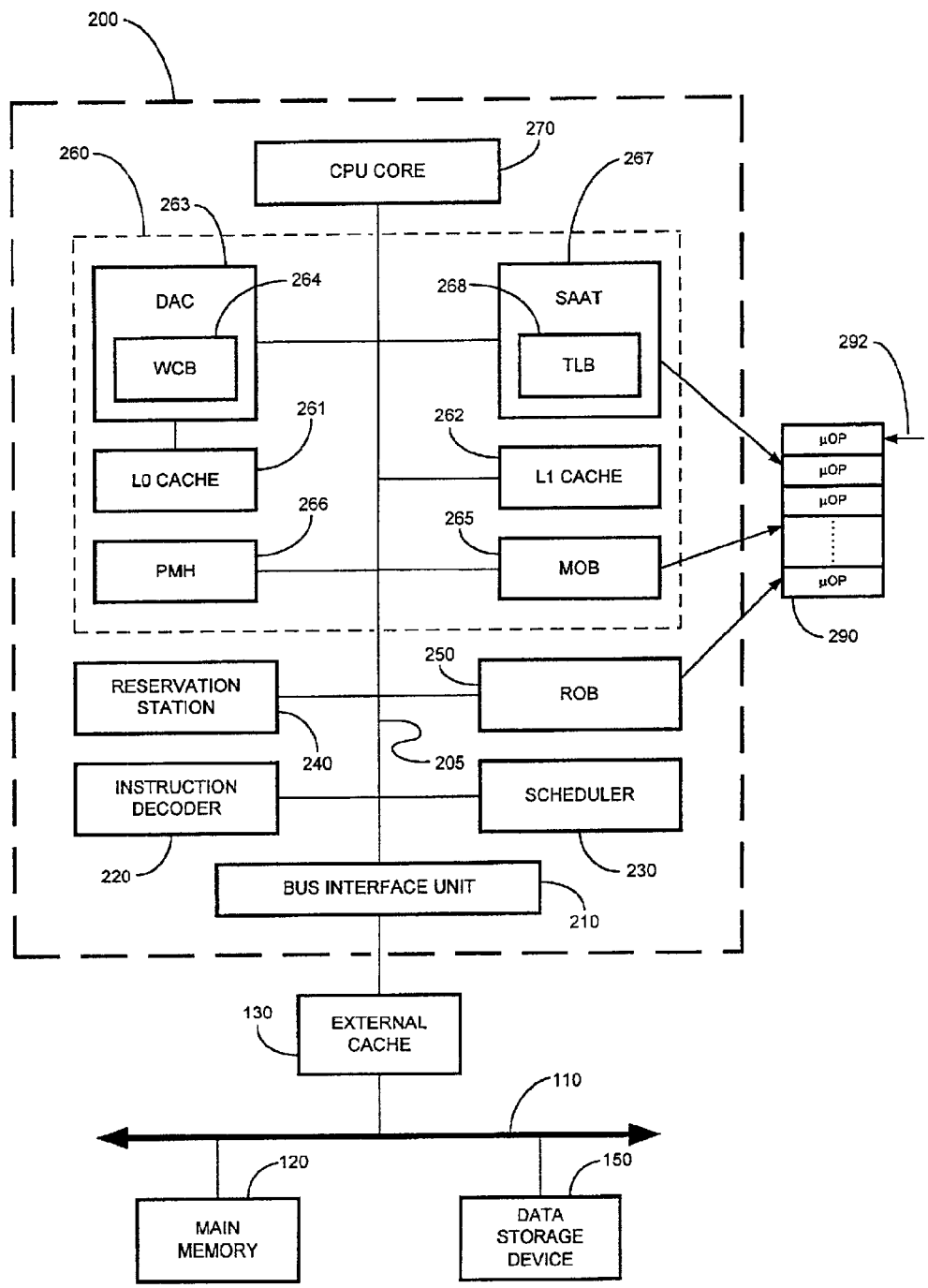
FIG. 2 shows a schematic diagram illustrating an exemplary embodiment of a processing device, as shown in FIG. 1.

Referring to FIG. 2, an exemplary embodiment of a processing device 200 is illustrated. The processor 200 includes a number of components that are interconnected by one or more buses, and these buses will be illustrated symbolically in FIG. 2 by a local bus 205. The local bus 205—and, hence, the components of processor 200—are coupled with a bus interface unit 210. The bus interface unit 210 couples the processing device 200 with system bus 110, thereby enabling communication between processor 200 and main memory 120, as well as between processor 200 and an external cache 130.

The processor 200 includes an instruction decoder 220 and a scheduler 230, both coupled with the local bus 205. The instruction decoder 220 receives an instruction (or instructions) associated with a program or piece of code executing on processor 200 and breaks the instruction down into one or more $\mu$OPs. The scheduler 230 receives $\mu$OPs from the instruction decoder 220 and schedules the $\mu$OPs for execution. The $\mu$OPs scheduled for execution by scheduler 230 may be associated with a single thread or, alternatively, multiple threads. Also, the $\mu$OPs may be scheduled in a speculative and/or out-of-order manner, as described above. Further, it should be understood that the processor 200 may receive one or more instructions associated with a program, whereas another processor 200 of computer system 100 may receive one or more instructions associated with the same program. Accordingly, a program may be executing on multiple processors 200.

The scheduler 230 outputs scheduled $\mu$OPs to a reservation station 240 and a re-order buffer (ROB) 250. The reservation station 240 stores instructions that have not been executed and then dispatches the instructions to a CPU core 270 for execution and/or to a memory cluster 260. The CPU core 270 comprises one or more execution units, such as, for example, an arithmetic and logic unit. If a $\mu$OP corresponds to, for example, an arithmetic operation, that $\mu$OP is dispatched to the CPU core 270, which then performs the arithmetic operation. If a $\mu$OP corresponds to a memory-referencing instruction—e.g., a load or a store—that $\mu$OP is dispatched to the memory cluster 260 and, more specifically, to a memory-ordering buffer (MOB) 265, as will be explained below.

The ROB 250 stores the results (which, again, may be speculative) of $\mu$OPs dispatched by the reservation station 240 and executed in CPU core 270. Due to unresolved conditions or antecedents resulting from the speculative execution of instructions, a $\mu$OP may not have properly executed in CPU core 270 and/or the results associated with the $\mu$OP may be speculative. Such a speculative $\mu$OP is sent into a replay loop (shown schematically at reference numeral 290) where the $\mu$OP is replayed until the $\mu$OP is no longer speculative—i.e., the $\mu$OP is non-speculative or "replay safe"—at which time any previously unresolved conditions and antecedents have been verified and, if necessary, the $\mu$OP is executed.

As noted above, although a series of $\mu$OPs associated with a piece of code may be executed out-of-order, these $\mu$OPs must generally be retired in order. Accordingly, the ROB 250 reorders the retirement of $\mu$OPs to achieve a sequence of events specified by a piece of code, wherein each $\mu$OP is retired when it has become replay safe. An "at-retire" pointer 292 identifies the "oldest" $\mu$OP in the replay loop 290 and, generally, it is this oldest $\mu$OP that is next in line to retire. When a $\mu$OP is ready to be retired, as identified by the at-retire pointer 292, resolution of all previously unresolved conditions or antecedents is verified and/or the $\mu$OP is executed, as noted above.

The memory cluster 260 includes one or more levels of cache memory, including, for example, an L0 cache 261 and an L1 cache 262. Each of the L0 cache 261 and L1 cache 262 can store data recently accessed, or expected to be accessed, by the CPU core 270. If an item of data requested by CPU core 270 is resident in one of the cache memories 261, 262, a cache "hit" has occurred; however, if the requested data is not present in cache, then a cache "miss" has occurred. One or more of the cache memories (e.g., L0 cache 261) may be coupled with a data access control unit (DAC) 263. The DAC 263 controls all transactions that resulted in a cache miss, as well as other transactions that require special handling. A lock, as described above, is one type of transaction that requires special handling by the DAC 263 and by other components of the memory cluster 260.

The DAC 263 may include a write-combining buffer (WCB) 264. The WCB 264 is, in essence, a cache memory for holding stores that may be combined and written to memory (e.g., a cache) in a single store operation, thereby reducing the number of memory accesses and improving bus bandwidth. For instance, a series of data stores may be combined and written to the same cache line within the WCB 264 and, when the cache line is full, the entire cache line is committed to memory. Generally, data stores of any memory type may be subjected to write-combining in the WCB 264, including cacheable and, in some instances, uncacheable stores.

The memory cluster 260 also includes the memory ordering buffer (MOB) 265, as noted above. Load and store instructions are dispatched from the reservation station 240 to the MOB 265. The MOB 265 ensures the proper ordering of load and store instructions and, further, provides for the proper sequencing of these transactions within the memory hierarchy (i.e., the various levels of memory within computer system 100, including L0 cache 261, L1 cache 262, external cache 130, main memory 120, and data storage device 150).

The memory cluster 260 further includes a page miss handler (PMH) 266 and a segmentation and address translation unit (SAAT) 267, the SAAT 267 including a translation lookaside buffer (TLB) 268 that provides a cache for virtual-to-physical address translations. The PMH 266 may handle certain events, such as page misses, cache misses, TLB misses, page splits, and cache splits, that can occur in response to a load instruction. In response to one of the aforementioned events, the PMH 266 will generate one or more μOPs to process the event. The SAAT 267 interfaces directly with the PMH 266, and the SAAT 267 detects the occurrence of any of the above-described events and issues a request to the PMH 266 to process the detected event. By way of example, if the SAAT 267 detects a TLB miss, the SAAT 267 will issue a request to the PMH 266 directing the PMH to execute a page walk in order to load the appropriate physical address translation from main memory 120 and into the TLB 268. In response, the PMH 266 will generate one or more μOPs to handle the page walk.

It should be understood that the processor 200 illustrated in FIG. 2 is intended to represent an exemplary embodiment of a processing device and, further, that such a processor may include many additional components that are not shown in these figures, these components having been omitted for ease of understanding. For example, the processor 200 may include an address generation unit, a register file unit, and internal clock circuitry. Also, although illustrated as discrete elements, it should be understood that many of the components shown in FIG. 2 may be combined and/or share circuitry. Most importantly, the embodiments described herein are not limited to any particular architecture or arrangement—as well as not being limited to any particular terminology used to describe such an architecture or arrangement—and the disclosed embodiments may be practiced on any type of processing device, irrespective of its architecture or the terminology ascribed to it.

Any one or more of the μOPs scheduled for execution by scheduler 220 may comprise a load instruction that has been tagged for a lock—i.e., a locked μOP. The lock, as noted above, corresponds to a sequence of instructions (e.g., load, modify, and store) that are performed in a manner (e.g., acquiring ownership of a memory location, performing an atomic operation, and releasing ownership of the memory location) that insures synchronization between processors and/or threads. The tag for lock is generally provided by a program executing on the processing device 200 that requires atomic operation. However, it should be understood that a tag for lock may be issued by, or derived from, any other source.

Figure 3:
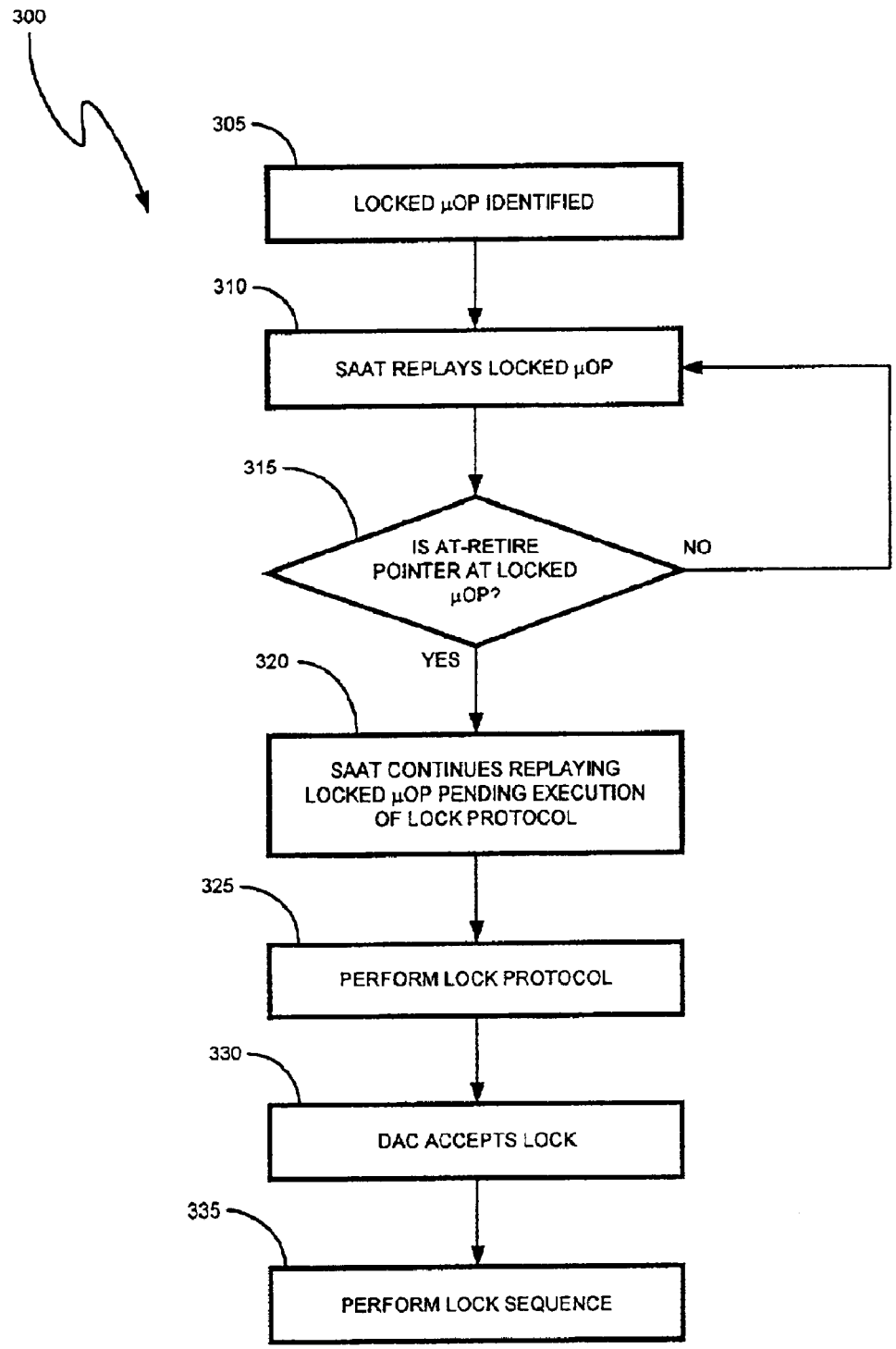
FIG. 3 shows a block diagram illustrating a conventional method of handling locks.

Referring now to FIG. 3, a conventional method 300 of handling a lock is illustrated in block diagram form. As shown at block 305, a locked μOP is identified by detecting or otherwise accessing the tag for lock associated with the locked μOP. Generally, the DAC 263 will access a μOP and determine whether the μOP includes a tag for lock. If a locked μOP is identified, the SAAT 267 will replay that load instruction until it is the oldest μOP in the replay loop 290, as shown at block 310. Generally, prior to performing a lock sequence, the locked μOP should be the oldest in the replay loop 290 to insure that all "older" memory operations (i.e., those operations that must be retired prior to the locked μOP, as required by the program being executed on processor 200) have been observed. Referring to reference numeral 315, when the locked μOP is the oldest μOP in the replay loop 290—as indicated by the at-retire pointer 292—a lock protocol will be performed. The SAAT 267 will, however, continue to replay the locked μOP pending execution of the lock protocol, as shown in block 320.

Referring to block 325, the lock protocol is now performed. During execution of the lock protocol, synchronization is performed to ensure that there are no operations older than the locked μOP that are pending to the "lock address" (i.e., the memory address associated with the locked load instructions). Further, required resources are reserved to ensure that all necessary resources are available to complete the lock operation. When the lock protocol is complete, the DAC 263 will accept the locked μOP, as illustrated at block 330, and assume responsibility for conducting the lock sequence.

Referring to block 335, the lock sequence may then be performed. Generally, the first step in the lock sequence is for the DAC 263 to obtain "ownership" of the lock address. To obtain such ownership, the DAC 263 issues a read-for-ownership (RFO) instruction to read the data from the lock address (i.e., the data that is the subject of the locked load instruction), and this data is written to a buffer that has been allocated to the lock. The allocated buffer is typically protected, such that other transactions cannot access the lock address during the lock sequence. After the RFO completes—the locked μOP having been replayed until completion of the RFO—the locked μOP has been executed and is, therefore, considered to be "replay safe." Once the locked μOP is replay safe, the modify operation of the lock sequence can be performed on the data contained in the allocated buffer. Subsequently, a Store Unlock instruction is executed to store the modified data at the lock address and, further, to unlock the allocated buffer and the locked memory location (i.e., the lock address).

Figure 4:
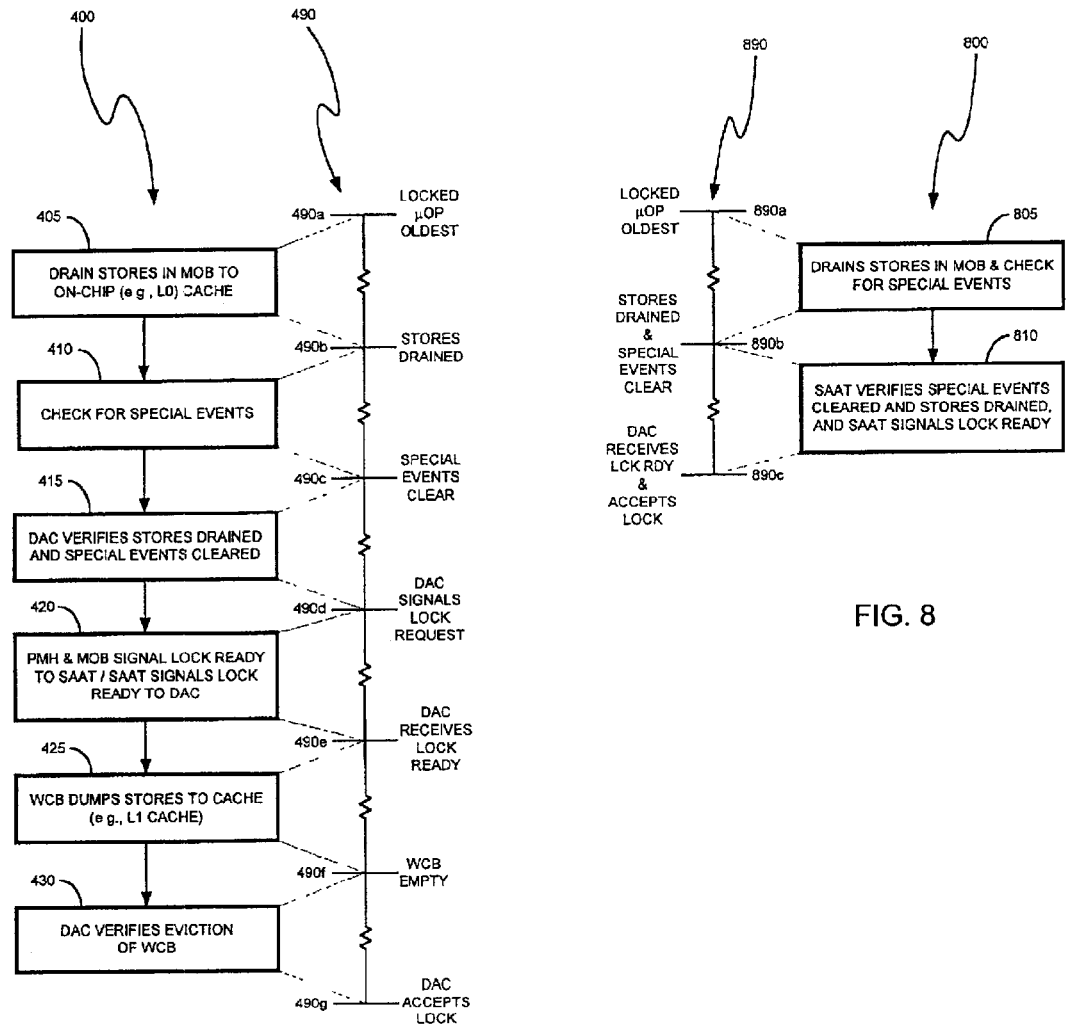
FIG. 4 shows a block diagram and accompanying timeline illustrating a conventional lock protocol.

Referring to FIG. 4, a conventional lock protocol 400—as may be performed at block 325 in FIG. 3—is illustrated in block diagram form in conjunction with a timeline 490. Again, the purpose of the lock protocol 400 is to perform synchronization such that no operations older than the locked μOP are pending to the "lock address" and to reserve required resources, such that all necessary resources are available to complete the lock operation. As illustrated by timeline 490, at some initial point in time 490a, the locked μOP becomes the oldest μOP in the replay loop 290 (see FIG. 3, reference numeral 315), as identified by the at-retire pointer 292. The SAAT 267 will continue to replay the locked μOP during execution of the lock protocol 400, as noted above (see FIG. 3, reference numeral 320).

Referring to block 405, the MOB 265 drains all pending stores to on-chip cache (e.g., L0 cache 261 or L1 cache 262) or other suitable memory. When all stores are drained—see time 490b—a check for any events or conditions that may require special processing is performed, as shown at block 410. Events requiring special processing include, for example, page misses, cache misses, TLB misses, page splits, cache splits, SAAT faults, as well as others (these events being referred to herein as "special events"). If such a special event is found—such events typically being detected by the SAAT 267—the special event is processed, this processing usually being performed by the PMH 266 and/or SAAT 267. Upon clearing of these special events or conditions, as depicted at time 490c, the DAC 263 verifies that all pending stores have been drained and that the memory cluster 260 is indeed ready to handle the lock—see block 415—and, at some later point in time 490d, the DAC 263 signals a lock request to the MOB 265, PMH 266, and SAAT 267.

In response to receipt of the lock request from the DAC 263, each of the MOB 265 and PMH 266 will complete any pending transactions and then send a lock ready signal to the SAAT 267, as shown at block 420. The SAAT 267 will also clear and/or complete any pending transactions and, upon receipt of the lock ready signals from the MOB 265 and PMH 266, respectively, the SAAT 267 will transmit a lock ready signal to the DAC 263—also as shown at block 420—to indicate to the DAC 263 that the necessary resources of the MOB 265, PMH 266, and SAAT 267 are free. Thus, at a further point in time 490e, the DAC 263 receives the lock ready signal.

In response to receipt of the lock ready signal at DAC 263, the WCB 264 will dump all pending stores to cache (e.g., L0 cache 261 or L1 cache 262) or other suitable memory—see block 425—such that the resources of the WCB 264 are available for handling the lock. When the WCB 264 has been evicted, as depicted at time 490f, the DAC 263 will verify eviction of the WCB 264, as illustrated in block 430. After verifying all stores have been dumped from the WCB 264, the DAC 263 will accept the lock, which is shown on the timeline 490 at time 490g.

Although the method 300 of handling locks treats all locked $\mu$OPs the same—i.e., it applies the same lock protocol to all locks—locked $\mu$OPs and their respective lock sequences are not, in practice, identical. Locks may have differing characteristics depending upon, for example, the type of memory associated with the lock address. More specific, the requirements for handling a lock directed to a lock address that is cacheable in an on-chip cache memory (e.g., L0 cache 261 or L1 cache 262) may be significantly different than the requirements for handling a lock directed to a lock address that is not amenable to on-chip cache storage—i.e., a store or write operation to external memory (e.g., main memory 120 or external cache 130) is necessary. A lock directed to a lock address that is cacheable will be referred to herein as a "cache lock," whereas a lock directed to a lock address that is not cacheable will be referred to herein as a "bus lock." Because a bus lock is directed to a memory address that is off-chip—e.g., it requires a transaction across bus interface unit 210 and/or system bus 110—the requirements for processing, as well as the resources required, are much more burdensome than the requirements and resources needed to handle a cache lock, which is directed to an on-chip memory address.

Because the method 300 for handling locks does not distinguish among cache and bus locks, the lock protocol 400 must be adapted to handle both bus locks and cache locks. Accordingly, the lock protocol 400 must meet the more demanding requirements and resource needs of bus locks, but this same lock protocol 400 is also being used for cache locks, which results in significant and unnecessary overhead for processing cache locks. Therefore, applying the lock protocol 400 to all locks, irrespective of whether the lock is a bus or cache lock, adds significant latency to the processing of cache locks, a situation that is especially troublesome because, in practice, the majority of locks are cache locks.

Figure 5:
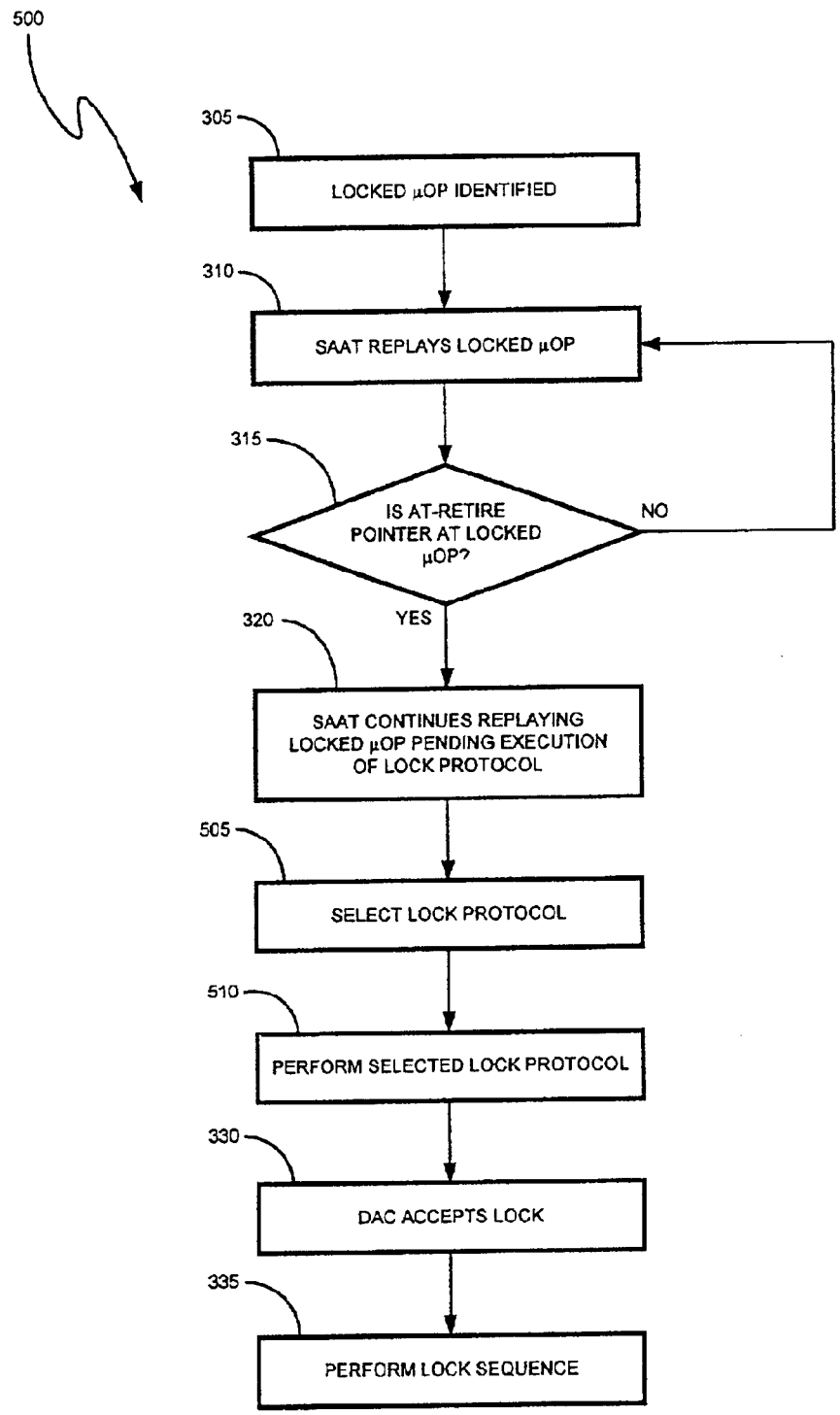
FIG. 5 shows a block diagram illustrating an embodiment of a method of handling locks.

Illustrated in FIG. 5 is an embodiment of a method 500 for handling cache locks that distinguishes between lock types (e.g., bus and cache locks), as may be performed by the processor 200. Many of the elements of the method 500 for handling cache locks are the same as those of the method 300 for handling cache locks and, accordingly, elements in FIG. 5 that have a corresponding element in FIG. 3 have retained the same reference numeral. The method 500 for handling locks is shown and described below in the context of distinguishing between bus and cache locks; however, it should be understood that the method 500 is not so limited and, further, that this method may be applied to any types or classifications of locks.

Referring to block 305 in FIG. 5, a locked $\mu$OP is identified by detecting or otherwise accessing the tag for lock associated with the locked $\mu$OP. Typically, the DAC 263 will access a $\mu$OP to determine whether the $\mu$OP includes a tag for lock. If a locked $\mu$OP is identified, the SAAT 267 will replay that load instruction until it is the oldest $\mu$OP in the replay loop 290, as shown at block 310. Referring to reference numeral 315, when the locked $\mu$OP is the oldest $\mu$OP in the replay loop 290—as indicated by the at-retire pointer 292—a lock protocol will be performed. The SAAT 267 will, however, continue to replay the locked $\mu$OP pending execution of the lock protocol, as shown in block 320.

Referring to block 505, a lock protocol is selected. As will be described in greater detail below, the lock protocol is selected based upon the type or characteristics of the lock. The selected lock protocol is then performed, as illustrated at block 510. Again, execution of the lock protocol provides synchronization and insures the availability of required resources for performing the lock sequence. Because selection of the lock protocol is determined in response to the specific type or characteristics of the pending lock, the lock protocol that is executed will be optimized for the particular lock being processed and, therefore, the overhead associated with lock handling is reduced and latency minimized.

When the lock protocol is complete, the DAC 263 will accept the locked $\mu$OP and assume responsibility for conducting the lock sequence, as shown at block 330. Referring to block 335, the lock sequence may then be performed. Generally, as noted above, the first step in the lock sequence is for the DAC 263 to obtain "ownership" of the lock address by issuing a RFO instruction to read the data from the lock address, which is written to a protected buffer that has been allocated to the lock. After the RFO completes and the locked $\mu$OP has been executed, the modify operation of the lock sequence can be performed on the data contained in the protected buffer. A Store Unlock instruction is then executed to store the modified data at the lock address and, further, to unlock the protected buffer and the locked memory location.

Figure 6:
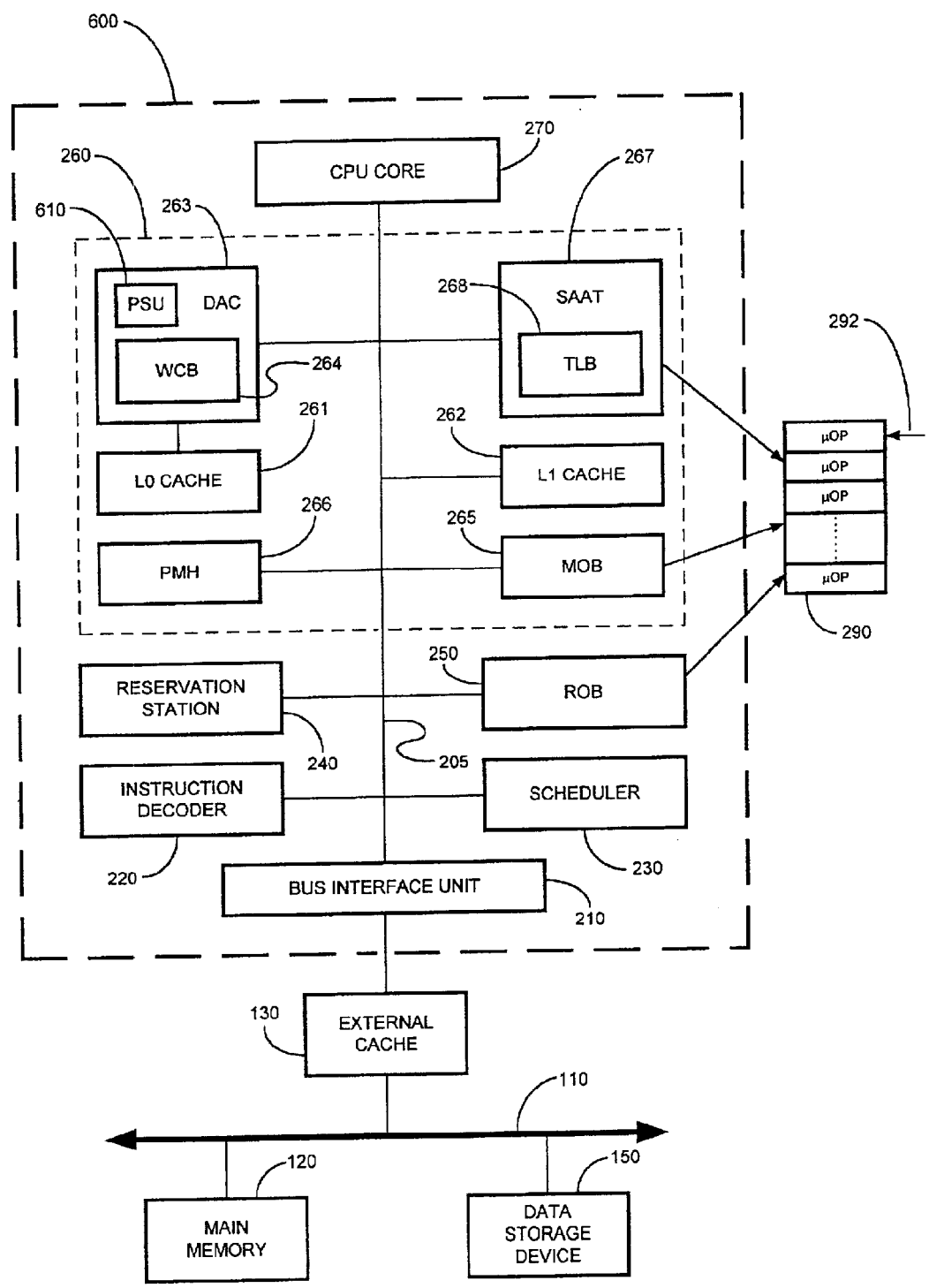
FIG. 6 shows a schematic diagram illustrating an embodiment of a processing device including a protocol selection unit.

Referring to FIG. 6, an embodiment of a processing device 600 is shown. The processing device 600 is similar to the processing device 200 shown and described with respect to FIG. 2, and like elements in FIG. 6 have retained the same numerical designation. The processing device 600 generally functions as described above for the processing device 200; however, the processing device 600 further includes a protocol selection unit (PSU) 610. The protocol selection unit 610 comprises any suitable logic and/or circuitry that can select a lock protocol, as shown in block 505 in FIG. 5. Although shown as forming a part of the DAC 263, it should be understood that the protocol selection unit 610 may form a part of any other component of the memory cluster 260 (or, more generally, of the processing device 600) or form a stand-alone functional element.

Figure 7:
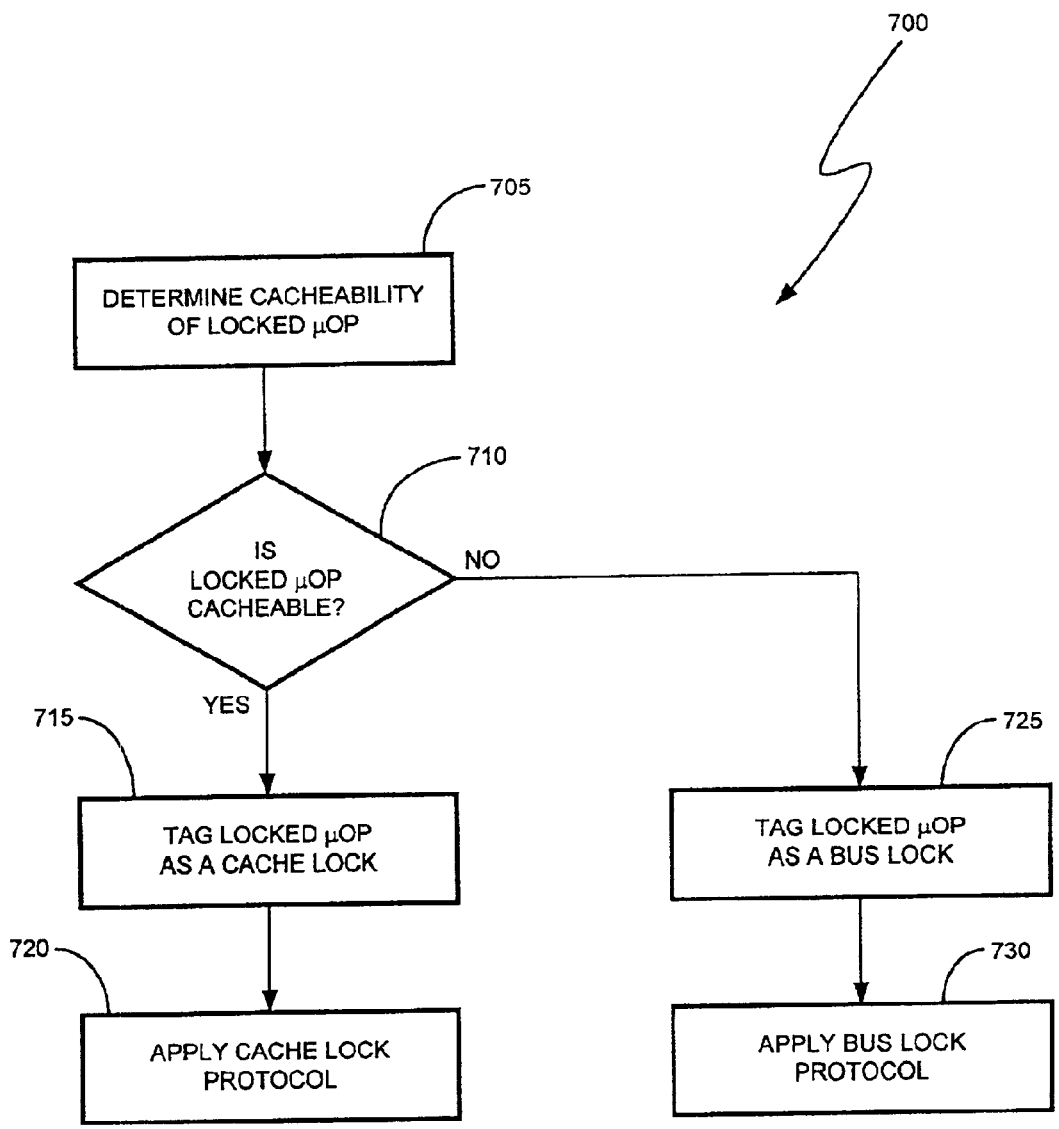
FIG. 7 shows a block diagram illustrating an embodiment of a method of selecting a lock protocol

Shown in FIG. 7 is an embodiment of a method 700 for selecting a lock protocol, as may be performed by protocol selection unit 610 (see FIG. 6). Referring to block 705, the cacheability of the identified locked µOP is determined. For example, a write-back memory type may be treated as cacheable, whereas a non-write-back memory type (e.g., a write-through memory type) would be classified as uncacheable. A lock address will be mapped by the SAAT 267 to a physical address location, and the memory type associated with this lock address may be ascertained by looking up the memory type of the translated physical address. For example, the SAAT 267 may drive a memory-type bus with memory type information for each identified locked µOP and, when the DAC 263 determines that a µOP includes a tag for lock, the DAC 263 will also access the memory-type bus to read the memory type information for the locked µOP. Any other suitable method for determining the memory type associated with a lock address may also be utilized.

Referring to reference numeral 710, if the locked µOP is associated with a lock address that is cacheable, the locked µOP is tagged as a cache lock, as shown at 715. As shown at block 720, the cache lock protocol is then applied to the lock during lock handling (see block 510 in FIG. 5). Because the cache lock is associated with an on-chip memory location, the overhead and latencies associated with the cache lock protocol will typically be much less than those associated with a bus lock protocol (see, e.g., FIG. 4), as noted above. An exemplary embodiment of such a cache lock (or "light weight") protocol is described below.

Referring again to reference numeral 710, if the locked µOP is associated with a lock address that is uncacheable, the locked µOP is tagged as a bus lock, as shown at block 725. As illustrated at block 730, a bus lock protocol is applied to the locked µOP during lock handling (see block 510 in FIG. 5). The lock protocol 400 of FIG. 4 is an example of a protocol adapted to handle bus locks.

In another embodiment, if the locked µOP is associated with a lock address that is cacheable (see reference numeral 710), the locked µOP is tagged as a cache lock (see block 715), and the cache lock protocol is then applied to the lock during lock handling (see block 720), as described above. However, if the locked µOP is associated with a lock address that is not cacheable (see reference numeral 710), the bus lock protocol is simply applied to handle the lock (see block 730) and a tag (identifying the lock as a bus lock) is not applied to the uncacheable lock. In other words, the element illustrated at block 725 may be omitted. In a further embodiment, if the locked µOP is associated with a lock address that is not cacheable (see reference numeral 710), the locked µOP is tagged as a bus lock (see block 725), and the bus lock protocol is then applied to the lock during lock handling (see block 730). If the locked µOP is, however, associated with a lock address that is cacheable (see reference numeral 710), the cache lock protocol is simply applied to handle the lock (see block 720) and a tag (identifying the lock as a cache lock) is not applied to the cacheable lock. Thus, the element illustrated at block 715 may be omitted in this embodiment.

An embodiment of a cache lock protocol 800 is illustrated in FIG. 8. It should be understood, however, that the cache lock protocol 800 of FIG. 8 is intended to represent only one example of such a cache lock protocol and, further, that any suitable cache lock protocol (as well as any suitable bus lock protocol) may be employed in the method 700 of selecting a lock protocol. Further, as previously suggested, the method 500 of handling locks and the method 700 of selecting a lock protocol, respectively, are not limited to the classifications of bus and cache locks.

Referring now to FIG. 8, the cache lock protocol 800 is shown in block diagram form in conjunction with a timeline 890. As illustrated by timeline 890, at some initial point in time 890a, the locked µOP becomes the oldest µOP in the replay loop 290, as identified by the at-retire pointer 292. The SAAT 267 will continue to replay the locked µOP during execution of the lock protocol 800. Referring to block 805, the MOB 265 drains all pending stores to on-chip cache (e.g., L0 cache 261 or L1 cache 262) or other suitable memory and, in parallel with draining the stores, a check for any special events (e.g., page misses, cache misses, TLB misses, page splits, cache splits, SAAT faults, etc.) in memory cluster 260 is performed. In an alternative embodiment, the MOB 265 does not drain the pending stores to on-chip cache.

When the stores have been drained and all special events or conditions cleared, as shown at point 890b on timeline 890, the SAAT 267 verifies that the special events are clear and also verifies the drainage of stores, and then the SAAT 267 provides a lock ready signal to the DAC 263, as illustrated at block 810. For the above-described alternative embodiment, wherein the stores are not drained, the SAAT 267 does not verify the drainage of stores prior to issuing a lock ready signal to the DAC 263. Rather, in response to verification that the special events are clear, the SAAT 267 provides the lock ready signal to DAC 263. Referring to point 890c on timeline 890, the DAC 263 accepts the lock in response to receipt of the lock ready signal provided by SAAT 267.

Figure 9:
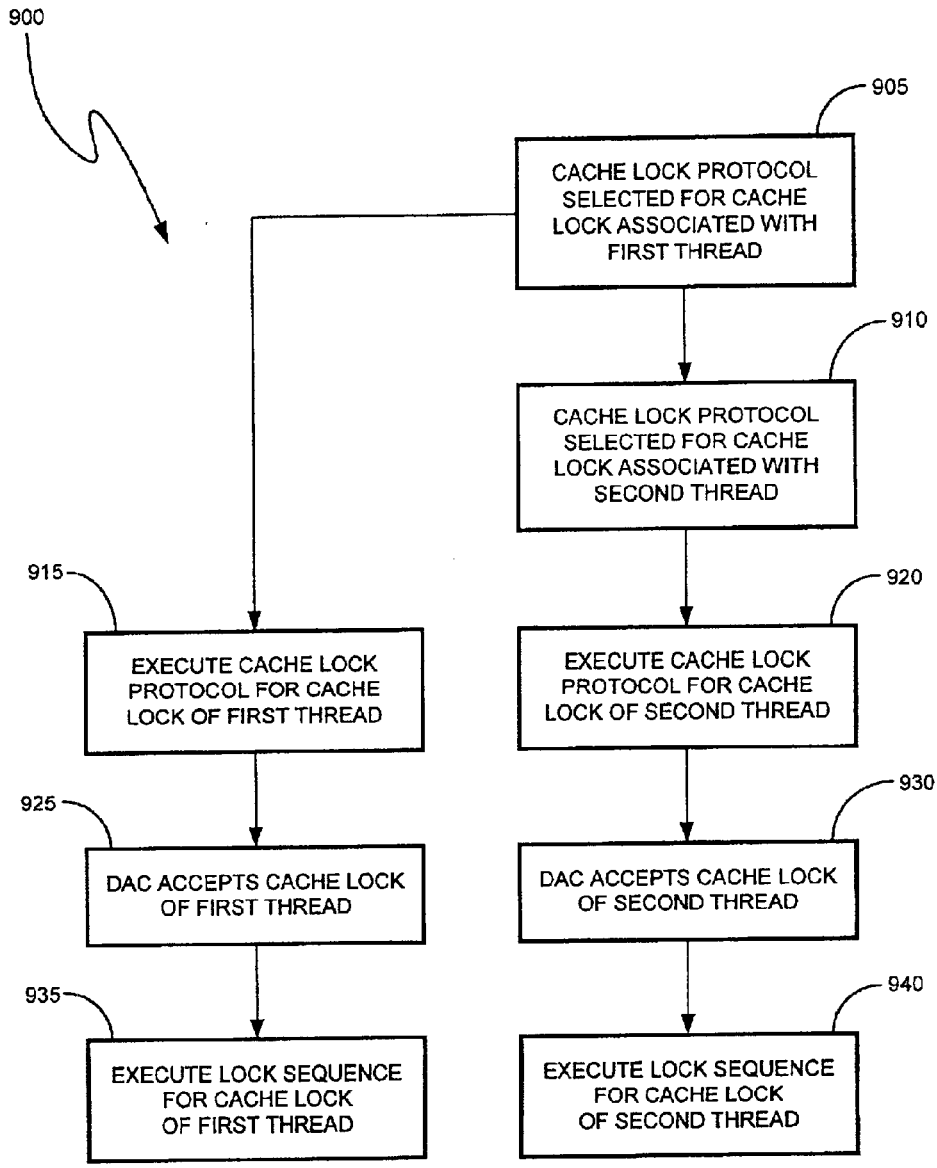
FIG. 9 shows a block diagram illustrating an embodiment of a method of concurrently processing cache locks associated with different threads.

Generally, during handling of a bus lock, the bus will be reserved (e.g., as by assertion of a lock pin on the bus) for execution of the lock sequence. Thus, bus locks cannot be processed in parallel but, rather, must be executed sequentially. However, processing of a cache lock does not require obtaining ownership of the bus and, because cache locks are now processed using a unique protocol, cache locks associated with different threads can be handled concurrently. Illustrated in FIG. 9 is a method 900 of concurrently processing cache locks associated with different threads. As shown at block 905, a cache lock protocol (e.g., the cache lock protocol 800) is selected for a cache lock associated with a first thread and, as illustrated at block 910, the cache lock protocol is selected for a cache lock associated with a second thread. The cache lock protocol is then executed for the cache locks associated with the first and second threads, respectively, as shown at blocks 915 and 920. Referring to blocks 925 and 930, the DAC 263 accepts the cache lock of the first thread and accepts the cache lock of the second thread. A lock sequence is then executed for the cache lock associated with the first thread, as shown at block 935, and, concurrently, as illustrated at block 940, a lock sequence is executed for the cache lock associated with the second thread. Thus, lock sequences for both of the first and second threads are performed in parallel, thereby reducing latency.

As set forth above, the method 700 of selecting a lock protocol, as well as the method 500 of handling locks, are not limited to distinguishing among cache and bus locks. Rather, the disclosed embodiments may be used to process any suitable number of lock types that are distinguished according to any suitable characteristic or set of characteristics. For example, locks may be classified based upon whether the locked μOP necessitates accessing an address split across two cache lines (i.e., a cache split). The more general applicability of the disclosed embodiments may be better understood with reference to the method 1000 of selecting a lock protocol illustrated in FIG. 10.

Figure 10:
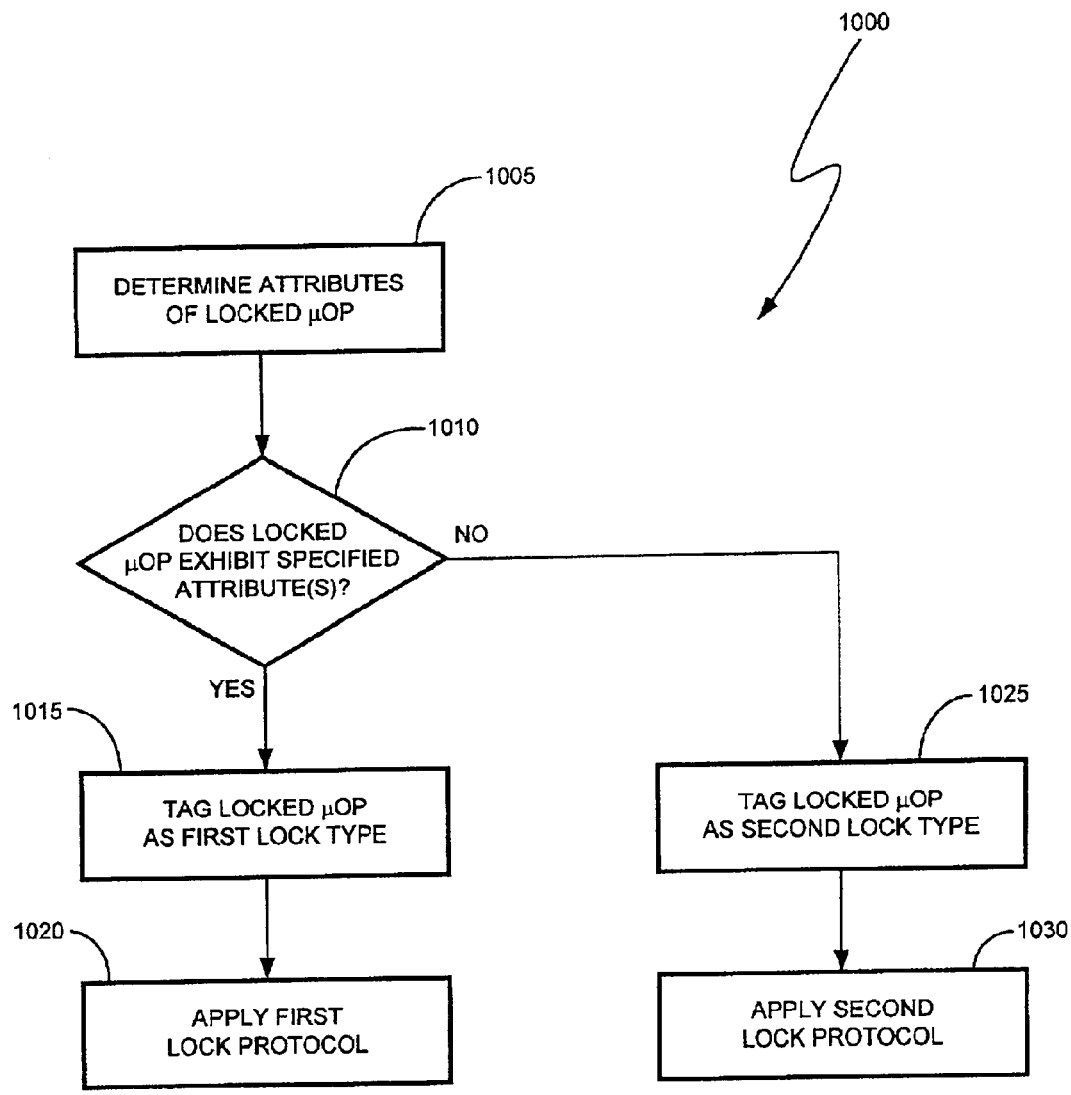
FIG. 10 shows a block diagram illustrating another embodiment of the method of selecting a lock protocol.

Referring to block 1005 in FIG. 10, one or more attributes (e.g., memory type, address split, etc.) of the identified locked μOP are determined. If the locked μOP exhibits one or more specified attributes—see reference numeral 1010—the locked μOP is tagged as a first lock type, as shown at 1015. As shown at block 1020, a first cache lock protocol is then applied to the lock during lock handling (see block 510 in FIG. 5). Referring again to reference numeral 1010, if the locked μOP does not exhibit the specified attribute or attributes (or if the locked μOP exhibits some other attribute or set of attributes), the locked μOP is tagged as a second lock type, as shown at block 1025. As illustrated at block 1030, a second lock protocol is applied to the locked μOP during lock handling (see block 510 in FIG. 5).

In another embodiment, if the locked μOP exhibits the one or more specified attributes (see reference numeral 1010) the locked μOP is tagged as a first lock type (see block 1015), and the first cache lock protocol is then applied to the lock during lock handling (see block 1020), as described above. However, if the locked μOP does not exhibit the specified attribute or attributes (see reference numeral 1010), the second lock protocol is simply applied to handle the lock (see block 1030) and a tag (identifying the lock as the second lock type) is not applied to the lock. In other words, the element illustrated at block 1025 may be omitted. Of course, the element illustrated at block 1015 (i.e., tagging the locked μOP as the first lock type) may be omitted rather than the element illustrated at block 1025. Stated another way, if a locked μOP exhibits one or more specified attributes, the locked μOP is tagged and a lock protocol applied to handle this tagged lock, whereas if the locked μOP does not exhibit the one or more specified attributes (or exhibits some other attribute or set of attributes), a different lock protocol is applied to handle this untagged lock.

For the method 1000 of selecting a lock protocol, any suitable attribute or attributes may be utilized to distinguish between locks. Further, any suitable number of lock protocols (and, hence, lock types) may be employed. For example, a certain set of attributes may correspond to yet a third lock type that requires a third lock protocol. Stated another way, if a locked μOP exhibits a first attribute or set of attributes, a first lock protocol is applied, and if the locked μOP exhibits a second attribute(s), a second lock protocol is applied, whereas if the locked μOP exhibits a third attribute (s), a third lock protocol is applied, and so on.

From a comparison of the cache lock protocol 800 with the lock protocol 400 of FIG. 4, a number of differences can be observed, and it can be seen that the latency associated with the cache lock protocol 800 will be significantly less than that associated with the lock protocol 400 (again, the lock protocol 400 is adapted to handle bus locks). The dissimilarities between the lock protocols 800, 400, as well as the variation in latencies associated with each of these protocols, arise due to the disparate resources required for processing cache and bus locks. Essentially, any step not strictly required for cache locks can be eliminated. For example, cache locks do not generally involve cache or page splits; therefore, a check for these special events may be eliminated. By way of further example, the WCB 264 does not have to be evicted for a cache lock; if the lock address has previously been loaded into the WCB 264, the WCB could be locked and the lock sequence completed from the WCB.

In other instances, where there is a tradeoff between performance and complexity, increased complexity may be acceptable for cache locks, whereas the increased complexity would not be acceptable for bus locks because the gain in performance does not outweigh the added complexity. For example, for the cache lock protocol 800, a two-way handshake between the DAC 263 and SAAT 267 was eliminated (as compared to the bus lock protocol 400). This two-way handshake hurts performance, but such a two-way handshake is desirable for the bus lock protocol 400 because it reduces complexity. However, for the cache lock protocol 800 that eliminates this two-way handshake, the added complexity is acceptable for the gain in performance. There may, of course, be other situations where the performance-complexity balance may tilt the other direction, and reduced complexity taken advantage of to increase performance.

By distinguishing between lock types and applying a unique protocol to each type of lock, microelectronic designers can now tailor a protocol for the specific type of lock that protocol is intended to process. Unnecessary steps can be eliminated. Further, any cost-benefit analysis (e.g., complexity vs. performance) can be directed to one type of lock, and any performance-enhancing feature may be advantageously realized, irrespective of that feature's affect on other types of locks. In sum, the worst-case scenario no longer governs the lock handling process for all types of locks, and a lock protocol may be optimized for a single type of lock that the protocol is intended to process, thereby improving performance and minimizing latency.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A method comprising:
   selecting a first lock protocol if a lock is associated with a first memory type; and
   selecting a second lock protocol if the lock is associated with a second memory type.

2. The method of claim 1, further comprising performing the selected lock protocol.

3. The method of claim 1, wherein the first memory type corresponds to an address that is cacheable and the second memory type corresponds to an address that is not cacheable.

4. A method comprising:
   determining whether a memory type is associated with a locked μOP;
   if the memory type is associated with the locked μOP, selecting a first lock protocol; and
   if the memory type is not associated with the locked μOP, selecting a second lock protocol.

5. The method of claim 4, further comprising tagging the locked μOP as a first lock type if the memory type is associated with the locked μOP.

6. The method of claim 5, further comprising tagging the locked μOP as a second lock type if the memory type is not associated with the locked μOP.

7. The method of claim 4, wherein the memory type corresponds to a memory address that is cacheable or a memory address that is not cacheable.

8. A method comprising:
determining whether a locked μOP is cacheable;
if the locked μOP is cacheable, selecting a cache lock protocol; and
if the locked μOP is not cacheable, selecting a bus lock protocol.

9. The method of claim 8, further comprising tagging the locked μOP as a cache lock if the locked μOP is cacheable.

10. The method of claim 9, further comprising tagging the locked μOP as a bus lock if the locked μOP is not cacheable.

11. A method comprising:
accessing a locked μOP;
selecting a lock protocol in response to a memory type associated with the locked μOP; and
executing the selected lock protocol.

12. The method of claim 11, wherein the locked μOP, when accessed, is being replayed in a replay loop.

13. The method of claim 11, wherein the lock protocol is selected from a cache lock protocol and a bus lock protocol.

14. The method of claim 11, wherein the memory type corresponds to a memory address that is cacheable or a memory address that is not cacheable.

15. The method of claim 11, further comprising performing a lock sequence.

16. A device comprising:
a local bus; and
a protocol selection unit coupled with the local bus, the protocol selection unit to
select a first lock protocol if a lock is associated with a first memory type; and
select a second lock protocol if the lock is associated with a second memory type.

17. The device of claim 16, wherein the first memory type corresponds to an address that is cacheable and the second memory type corresponds to an address that is not cacheable.

18. The device of claim 16, further comprising a memory cluster, the protocol selection unit coupled with the memory cluster.

19. The device of claim 18, wherein the memory cluster includes a cache memory.

20. A device comprising:
a local bus; and
a protocol selection unit coupled with the local bus, the protocol selection unit to
determine whether a memory type is associated with a locked μOP;
if the memory type is associated with the locked μOP, select a first lock protocol; and
if the memory type is not associated with the locked μOP, select a second lock protocol.

21. The device of claim 20, the protocol selection unit to tag the locked μOP as a first lock type if the memory type is associated with the locked μOP.

22. The device of claim 21, the protocol selection unit to tag the locked μOP as a second lock type of the memory type is not associated with the locked μOP.

23. The device of claim 20, wherein the a memory type corresponds to a memory address that is cacheable or a memory address that is not cacheable.

24. The device of claim 20, further comprising a memory cluster, the protocol selection unit coupled with the memory cluster.

25. The device of claim 24, wherein the memory cluster includes a cache memory.

26. An article of manufacture comprising:
a medium having content that, when accessed by a device, causes the device to
select a first lock protocol if a lock is associated with a first memory type; and
select a second lock protocol if the lock is associated with a second memory type.

27. The article of manufacture of claim 26, wherein the content, when accessed, further causes the device to perform the selected lock protocol.

28. The article of manufacture of claim 27, wherein the first memory type corresponds to an address that is cacheable and the second memory type corresponds to an address that is not cacheable.

29. An article of manufacture comprising:
a medium having content that, when accessed by a device, causes the device to
determine whether a memory type is associated with a locked μOP;
if the memory type is associated with the locked μOP, select a first lock protocol; and
if the memory type is not associated with the locked μOP, select a second lock protocol.

30. The article of manufacture of claim 29, wherein the content, when accessed, further causes the device to tag the locked μOP as a first lock type if the memory type is associated with the locked μOP.

31. The article of manufacture of claim 30, wherein the content, when accessed, further causes the device to tag the locked μOP as a second lock type if the memory type is not associated with the locked μOP.

32. The article of manufacture of claim 39, wherein the memory type corresponds to a memory address that is cacheable or a memory address that is not cacheable.

* * * * *